United States Patent
Vollert et al.

(10) Patent No.: US 8,091,690 B2
(45) Date of Patent: Jan. 10, 2012

(54) SELF-BOOSTING DISK BRAKE

(75) Inventors: Herbert Vollert, Vaihingen/Enz (DE);
Dietmar Baumann, Hemmingen (DE);
Andreas Henke, Ditzingen (DE);
Bertram Foitzik, Ilsfeld (DE); Willi Nagel, Remseck/Hochdorf (DE); Dirk Hofmann, Knor-pod Cvilinem (CS)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/740,567

(22) PCT Filed: Oct. 23, 2008

(86) PCT No.: PCT/EP2008/064388
§ 371 (c)(1),
(2), (4) Date: Apr. 29, 2010

(87) PCT Pub. No.: WO2009/056485
PCT Pub. Date: May 7, 2009

(65) Prior Publication Data
US 2010/0258386 A1    Oct. 14, 2010

(30) Foreign Application Priority Data
Oct. 29, 2007 (DE) .................... 10 2007 051 556

(51) Int. Cl.
*F16D 55/14* (2006.01)

(52) U.S. Cl. ..................... 188/72.7; 188/72.2
(58) Field of Classification Search ............... 188/72.2, 188/72.6, 72.7, 156–164
See application file for complete search history.

(56) References Cited

U.S. PATENT DOCUMENTS

| | | | | | |
|---|---|---|---|---|---|
| 3,662,864 | A | * | 5/1972 | Evans | 188/72.2 |
| 5,472,068 | A | * | 12/1995 | Weiler et al. | 188/73.44 |
| 6,298,954 | B1 | * | 10/2001 | Weiler et al. | 188/71.1 |
| 6,315,086 | B1 | * | 11/2001 | Schmitt et al. | 188/72.7 |
| 6,705,437 | B2 | * | 3/2004 | Severinsson et al. | 188/73.32 |
| 6,957,723 | B2 | * | 10/2005 | Baumann et al. | 188/72.7 |
| 6,991,074 | B1 | | 1/2006 | Mackiewicz | |
| 7,073,636 | B2 | * | 7/2006 | Baumann et al. | 188/72.2 |
| 7,273,134 | B2 | * | 9/2007 | Schack et al. | 188/72.8 |
| 7,364,021 | B2 | * | 4/2008 | Baumann et al. | 188/72.7 |
| 2004/0154881 | A1 | * | 8/2004 | Baumann et al. | 188/72.2 |
| 2005/0121267 | A1 | * | 6/2005 | Baumann et al. | 188/156 |
| 2007/0199781 | A1 | * | 8/2007 | Mackiewicz et al. | 188/370 |
| 2008/0073164 | A1 | * | 3/2008 | Baumann | 188/72.2 |

FOREIGN PATENT DOCUMENTS
EP    1655506 A2    5/2006

* cited by examiner

*Primary Examiner* — Christopher Schwartz
(74) *Attorney, Agent, or Firm* — Ronald E. Greigg

(57) ABSTRACT

The invention relates to a self-reinforcing, in particular electromechanical disk brake having a wedge mechanism as the self-boosting device, for example. The invention proposes that the actuating device be attached to a separate holder, which does not have forces or torques of the wedge mechanism applied thereto.

10 Claims, 2 Drawing Sheets

SELF-BOOSTING DISK BRAKE

CROSS-REFERENCE TO RELATED APPLICATION

This application is a 35 USC 371 application of PCT/EP2008/064388 filed on Oct. 23, 2008.

BACKGROUND OF THE INVENTION

1. Field of the Invention

The invention relates to a self-boosting disk brake. The disk brake is intended in particular as a wheel brake of a motor vehicle.

2. Description of the Prior Art

A disk brake of this kind is known from German Patent Disclosure DE 103 02 516 A1. The known disk brake has a brake caliper, in which a friction brake lining is disposed on one side of a brake disk and can be pressed for brake actuation against the brake disk by an actuation device.

As a self-boosting device, the known disk brake has a wedge mechanism, with a wedge face extending obliquely at a wedge angle to the brake disk, on which face the friction brake lining is braced and along which the friction brake lining is movable. When the rotating brake disk exerts a frictional force on the friction brake lining that is pressed against it when the brake is actuated, the bracing of the friction brake lining at the wedge angle on the wedge face of the wedge mechanism effects a supporting force on the friction brake lining that is oriented perpendicular to the wedge face. One component of the supporting force acts on the friction brake lining perpendicular to the brake disk. This component of the supporting force of the wedge mechanism is a contact pressure, which presses the friction brake lining against the brake disk. The contact pressure effected by the wedge mechanism acts on the friction brake lining in addition to an actuation force that exerted by the actuation device and that together with the contact pressure exerts a tensing force, with which the friction brake lining is pressed against the brake disk. In the manner described, the wedge mechanism converts the frictional force, exerted by the rotating brake disk on the friction brake lining that is pressed against it when the disk brake is actuated, into a contact pressure that presses the friction brake lining against the brake disk. As a result of the contact pressure exerted on the friction brake lining in addition to the actuation force, a braking force of the disk brake is increased; the wedge mechanism effects self-boosting of the disk brake.

As the actuation device, the known disk brake selectively contemplates an electromechanical actuation device with an electric motor, optionally a step-down gear, and a spindle drive, or in other words a screw drive, or selectively a hydraulic actuation device with a hydraulic piston. The actuation device is secured to the brake caliper on the same side as the friction brake lining and on the same side as the wedge mechanism that forms the self-boosting device.

The wedge mechanism of the known disk brake acts on the brake caliper in the sense of spreading it open. Since in practice the brake caliper is not absolutely rigid, the wedge mechanism effects an elastic spreading open of the brake caliper, which lengthens an actuation travel of the actuation device. Actuation energy necessary for brake actuation is increased accordingly.

ADVANTAGES AND SUMMARY OF THE INVENTION

The disk brake according to the invention has its own holder for the actuation device, and this holder is not directly acted upon with a force or a moment by the self-boosting device. As a result, an elastic spreading apart of the brake caliper, caused by forces or moments that the self-boosting device exerts, does not lengthen the actuation travel that the actuation device performs for pressing the friction brake lining against the brake disk and for building up the actuation force. Actuation energy that the actuation device must exert for brake actuation is increased just as little by an elastic spreading apart of the brake caliper. A further advantage of the invention is that the holder of the actuation device must withstand only the actuation force exerted by the actuation device, and not the full tensing force of the disk brake; its deformation—assuming the same rigidity as the brake caliper—is consequently reduced. This again contributes to a short actuation travel and low actuation energy. The brake caliper itself can be designed as less rigid and consequently lighter in weight. A less-rigid brake caliper causes less noise and reduces an excitation to vibration. Since the rigidity of the holder can be selected independently of the rigidity of the brake caliper, the invention affords additional opportunities for targeted variation of noise development and the vibration behavior, possibilities that are lacking in a brake caliper on which the actuation device is mounted on the same side as the self-boosting device.

The holder of the actuation device of the disk brake of the invention may be a part that is separate from the brake caliper and that is for instance an integral component of a brake holder or is screwed to an axle arm or the like. One aspect of the invention provides that the holder is connected to the brake caliper, for instance screwed to it or integral with it. Unlike in the prior art, however, the holder is connected to the brake caliper on a side that relative to the brake disk is opposite the side on which the friction brake lining, which acts on the actuation device, is disposed. In the prior art, the self-boosting device is disposed on that side of the brake disk as well.

Instead of a wedge mechanism, the disk brake of the invention may also have some other mechanical self-boosting device, such as a lever mechanism with one or more support levers positioned obliquely to the brake disk and bracing the friction brake lining. Even a nonmechanical self-boosting device, for instance a hydraulic self-boosting device, is possible. Hydraulic self-boosting devices are known per se and therefore need not be explained here. Instead of a wedge mechanism, the disk brake of the invention may also have a ramp mechanism. In a distinction from the wedge mechanism, in which the wedge face, over its entire length, has the same wedge angle to the brake disk, a ramp of a ramp mechanism can have a varying slope. As a result, the magnitude of the self-boosting varies as well. When the braking force is high, major self-boosting can be achieved.

The invention is not limited to an electromechanical actuation device; it can also have some other actuation device, for instance pneumatic or hydraulic. An electromechanical actuation device is not limited to an electric motor with a gear; a linear motor, electromagnet, or piezoelectric element is also possible for brake actuation.

BRIEF DESCRIPTION OF THE DRAWINGS

The invention will be described below in terms of an exemplary embodiment shown in conjunction with the drawings, in which.

Figure 1:
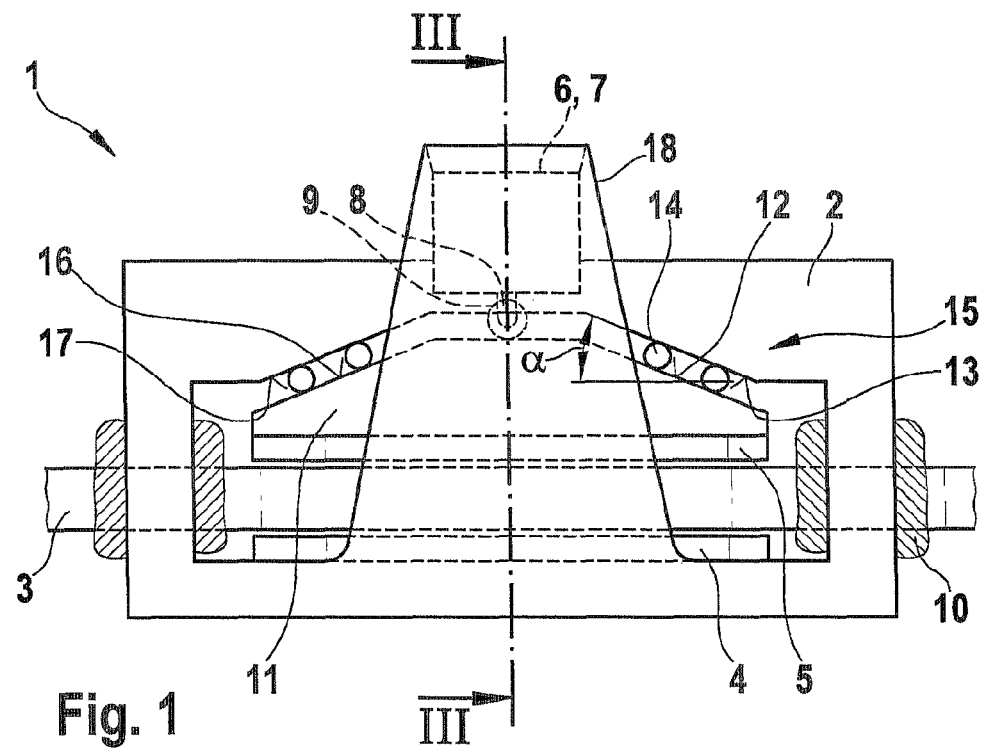
FIG. 1 shows a self-boosting disk brake in accordance with the invention, looking radially from outside onto a brake disk.

The drawings are to be understood as schematic, simplified illustrations for the sake of explanation and comprehension of the invention.

DESCRIPTION OF THE PREFERRED EMBODIMENT

The disk brake 1 of the invention, shown in the drawings, has a brake caliper 2, in which two friction brake linings 4, 5 are disposed, one on either side of a brake disk 3. One of the two friction brake linings, the brake lining 4, is disposed immovably in the brake caliper 2 and will hereinafter be called the fixed friction brake lining 4. The other friction brake lining 5 is movable in the brake caliper 2 in a manner to be explained below and will hereinafter be called the movable friction brake lining 5.

The disk brake 1 has an electromechanical actuation device 6, which is disposed on the same side of the brake disk 3 as the movable friction brake lining 5. The actuation device 6 need not necessarily be electromechanical; it may for instance be hydraulic, pneumatic or mechanical, in the last case for instance via a Bowden cable and/or a lever. The actuation device 6 has an electric motor 7 and a spindle drive that converts a rotational motion of the electric motor 7 into a translational motion for pressing the movable friction brake lining 5 against the brake disk 3. Between the electric motor and the spindle drive, there can be a step-down gear, such as a planetary gear, which is not shown in the drawings. On one end of a spindle 8 of the spindle drive, a roller 9 is rotatably supported for reducing friction, and with it the spindle drive acts on the movable friction brake lining 5.

Figure 2:
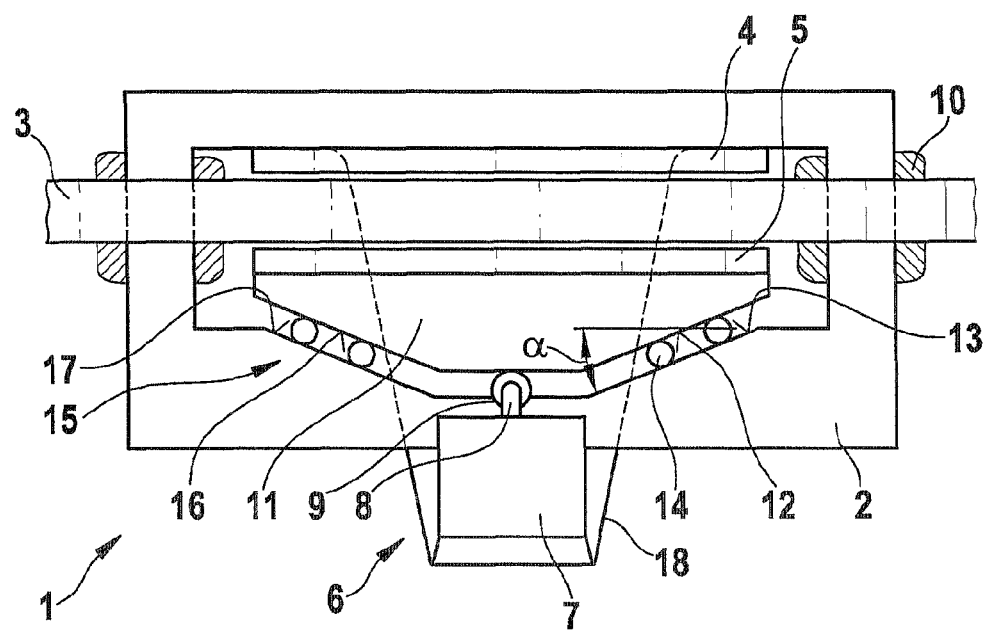
FIG. 2 shows the disk brake of FIG. 1 looking from the opposite direction.
Figure 3:
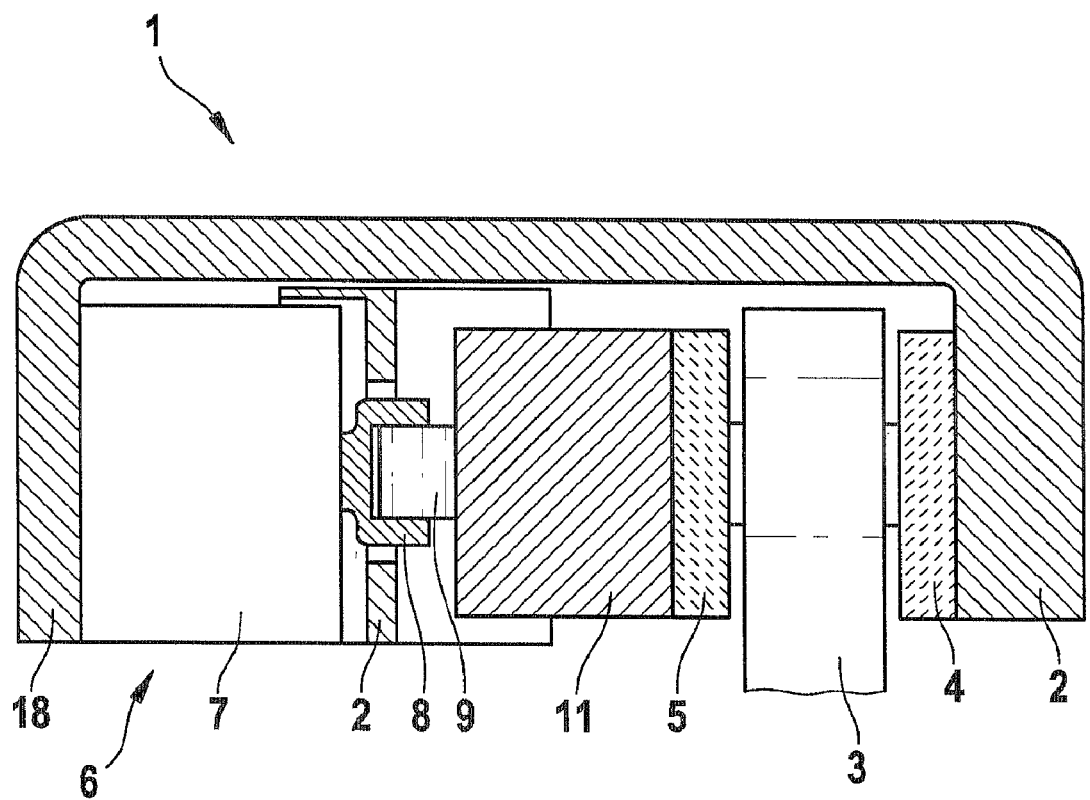
FIG. 3 is a section through the disk brake of FIG. 1 in a radial plane to the brake disk, along the line III-III in FIG. 1, on a larger scale.

For brake actuation, by means of a supply of current to the electric motor 7, the movable friction brake lining 5 is pressed against the brake disk 3. The brake caliper 2 is embodied as a floating caliper; that is, it is guided displaceably transversely to the brake disk 3. Pressing the movable friction brake lining 5 against the one side of the brake disk 3 displaces the brake caliper 2 transversely to the brake disk 3 and presses the fixed friction brake lining 4 against the other side of the brake disk 3. The disk brake 1 is tightened and brakes the brake disk 3. Guides 10, which guide the brake caliper 2 displaceably transversely to the brake disk 3, are indicated by symbols in FIGS. 1 and 2.

On a back side, remote from the brake disk 3, the movable friction brake lining 5 has a wedge body 11, with wedge faces 12 extending obliquely at a wedge angle α to the brake disk 3. With the wedge faces 12, the wedge body 11 is braced on corresponding wedge faces 13 of the brake caliper 2. The wedge faces 13 of the brake caliper 2 likewise extend at the wedge angle α obliquely to the brake disk 3; the wedge body 11 and with it the movable friction brake lining 5 are displaceable along the wedge faces 13 in the brake caliper 2. For reducing friction, rollers 14 are disposed as roller bodies between the wedge faces 12, 13 of the wedge body 11 and of the brake caliper 2.

If for brake actuation, with the brake disk 3 rotating, the movable friction brake lining 5 is pressed by the actuation device 6 against the brake disk 3, the brake disk exerts a frictional force on the movable friction brake lining 5. The frictional force acts on the wedge body 11, which is mounted on the back side of the movable friction brake lining 5. The frictional force exerted by the rotating brake disk 3 on the movable friction brake lining 5 pressed against it urges the wedge body 11 into an increasingly narrower wedge gap between the wedge face 13 of the brake caliper 2 and the brake disk 3. In accordance with the wedge principle, the wedge face 13 of the brake caliper 2, on which the movable friction brake lining 5 is braced via its wedge body 11, exerts a supporting force that is oriented perpendicular to the wedge face 13. The supporting force has a component perpendicular to the brake disk 3 that is called the contact pressure. The contact pressure, in addition to the actuation force exerted by the actuation device 6, presses the friction brake lining 5 against the brake disk 3. The wedge body 11 with the wedge faces 12 and the complementary wedge faces 13 of the brake caliper 2 form a wedge mechanism 15, which in the manner described boosts an actuation force exerted by the actuation device 6 and thus boosts a braking force of the disk brake 1. With the wedge mechanism 15, the disk brake 1 has a mechanical self-boosting device. For a reversed direction of rotation of the brake disk 3, the wedge mechanism 15 has wedge faces 16, 17 with opposite inclination. The wedge angle α can be the same or different for both directions of rotation of the brake disk 3.

The actuation device 6 is secured to a holder 18, which on the side of the fixed friction brake lining 4 is integral with the brake caliper 2. The holder 18 is accordingly connected to the brake caliper 2 on a side of the brake disk 3 that is opposite both the movable friction brake lining 5 and the wedge mechanism 15. The holder 18 grips the brake disk 3 on its circumference and protrudes to the side of the brake disk 3 on which the wedge mechanism 15 and the movable friction brake lining 5 are disposed. The actuation device 6, which is mounted on the holder 18, is also located on that side of the brake disk 3. For the holder 18, it would also be conceivable for a frame construction with two tie anchors, which are disposed in the circumferential direction of the brake disk 3 next to the movable friction brake lining 5 and grip the brake disk 3 at the level of the friction brake lining 5 (not shown). As a result, bending stress on the holder is reduced. The holder 18 is not directly acted upon by forces or moments of the wedge mechanism 15. In particular, a spreading apart of the brake caliper 2 upon a brake actuation does not act directly on the holder 18 and on the actuation travel that the actuation device 6 must execute for attaining a defined braking force. By means of a rigid holder 18 that deforms only slightly under load, the actuation travel of the actuation device 6 is kept short even when the brake caliper 2 is relatively nonrigid. The holder 18 is directly acted upon only by the actuation force of the actuation device 6, and not by the contact pressure that the wedge mechanism 15 exerts; as a result, elastic deformation of the holder 18 is slight.

The foregoing relates to the preferred exemplary embodiment of the invention, it being understood that other variants and embodiments thereof are possible within the spirit and scope of the invention, the latter being defined by the appended claims.

The invention claimed is:
1. A self-boosting disk brake, comprising:
a brake caliper in which a friction brake lining is disposed;
a brake disk;
an actuation device by which the friction brake lining can be pressed against the brake disk;
a self-boosting device which converts a frictional force, exerted when the disk brake is actuated by the brake disk when rotating, onto the friction brake lining pressed against the brake disk, into a contact pressure, which presses the friction brake lining against the brake disk; and a holder for the actuation device, which holder is not directly subjected to a force or a moment by the self-boosting device, wherein the friction brake lining is a first friction brake lining, wherein the brake caliper has a second friction brake lining disposed therein and located on an opposite side of the brake disk from the first friction brake lining, wherein the first friction brake lining, the self-boosting device, and the actuation device are all located on one side of the brake disk, and the second friction brake lining is located on an opposite side of the brake disk, and wherein the holder is directly attached to the actuation device on said one side of the brake disk and is directly attached to the brake caliper on said opposite side of the brake disk.

2. The self-boosting disk brake as defined by claim 1, wherein the holder has a higher modulus of elasticity than the brake caliper.

3. The self-boosting disk brake as defined by claim 2, wherein the disk brake has a mechanical self-boosting device.

4. The self-boosting disk brake as defined by claim 3, wherein the self-boosting device has a ramp mechanism, with a ramp that extends at an angle to the brake disk, along which the friction brake lining is braced and along which the friction brake lining is movable.

5. The self-boosting disk brake as defined by claim 2, wherein the disk brake has an electromechanical actuation device.

6. The self-boosting disk brake as defined by claim 1, wherein the disk brake has a mechanical self-boosting device.

7. The self-boosting disk brake as defined by claim 6, wherein the self-boosting device has a ramp mechanism, with a ramp that extends at an angle to the brake disk, along which the friction brake lining is braced and along which the friction brake lining is movable.

8. The self-boosting disk brake as defined by claim 1, wherein the disk brake has an electromechanical actuation device.

9. The self-boosting disk brake as defined by claim 1, wherein the self-boosting device does not directly contact the holder during braking.

10. The self-boosting disk brake as defined by claim 1, wherein the holder is directly connected to the actuation device.

* * * * *